United States Patent [19]

Inoue

[11] 4,126,576

[45] Nov. 21, 1978

[54] PROCESS FOR PREPARATION OF CATALYTIC COMPONENTS FOR POLYMERIZATION OF α-OLEFINS

[75] Inventor: Masuo Inoue, Chigasaki, Japan

[73] Assignee: Toho Titanium Company, Limited, Tokyo, Japan

[21] Appl. No.: 795,147

[22] Filed: May 9, 1977

Related U.S. Application Data

[63] Continuation-in-part of Ser. No. 629,890, Nov. 7, 1975, abandoned.

[30] Foreign Application Priority Data

Dec. 6, 1974 [JP] Japan ................................. 49/140793

[51] Int. Cl.$^2$ ............................................. B01J 31/02
[52] U.S. Cl. ................................................. 252/429 B
[58] Field of Search ..................................... 252/429 B

[56] References Cited

U.S. PATENT DOCUMENTS

| 3,129,256 | 4/1964 | Hay et al. ..................... 252/429 B X |
| 3,287,341 | 11/1966 | Tazewell et al. ............. 252/429 B X |
| 3,652,487 | 3/1972 | Ward et al. ................... 252/429 B X |
| 3,888,835 | 6/1975 | Ito et al. ....................... 252/429 B X |

Primary Examiner—Delbert E. Gantz
Assistant Examiner—William G. Wright
Attorney, Agent, or Firm—Oblon, Fisher, Spivak, McClelland & Maier

[57] ABSTRACT

A process for preparation of a component of a catalyst for polymerization of α-olefins comprising adding (a) oxygen and the reaction product of titanium tetrachloride and an organic ether, to (b) titanium trichloride or to a composition of titanium trichloride and a metal halide, and milling the mixture.

11 Claims, No Drawings

PROCESS FOR PREPARATION OF CATALYTIC COMPONENTS FOR POLYMERIZATION OF α-OLEFINS

This application is a continuation-in-part of application Ser. No. 629,890, filed Nov. 7, 1975, now abandoned.

BACKGROUND OF THE INVENTION

1. Field of the Invention

The present invention relates generally to a catalyst and more particularly, to a specific component of a catalyst used for polymerization of α-olefins in high yield and a process for the preparation thereof.

2. Description of the Prior Art

It is known in the art that catalytic components formed by pulverising pure titanium trichloride can be used for polymerization of α-olefin having at least 3 carbon atoms, as for example, propylene. These components can be obtained by reducing titanium tetrachloride with hydrogen or metallic titanium; by pulverising a solid chloride having a composition corresponding substantially equal to $Ti_3 Al Cl_{12}$, which is obtained by reducing titanium tetrachloride with metallic aluminum; or by pulverising a mixture of pure titanium trichloride or the solid chloride having the composition corresponding substantially equal to $Ti_3 Al Cl_{12}$ with an organic ether and/or other known components such as an electron-donative compound.

In the preparation of a polymer of α-olefin, e.g., polypropylene, when the yield of the crystalline form of the high-polymer is improved, there is also a concomitant improvement in the yield of the overall final product and in the quality of the final product. Conventionally, in polymerization of α-olefins, the yield of the crystalline polymer is more greatly influenced by changes in the properties of the catalytic component than it is by correspondingly significant changes in either the polymerization conditions or the polymerization method. However, the yield is influenced to some extent by the choice of polymerization method or polymerization conditions. Therefore, the improvement of the properties of the catalytic component is a significant problem not only to manufacturers of catalysts, but also to manufacturers of polypropylene.

The present inventor proposed a process for the preparation of a catalytic component for polymerization of α-olefins which included the steps of forming the reaction product of titanium tetrachloride and an organic ether, adding it to titanium trichloride or a composition comprising titanium trichloride and a metal halide, and then conducting a pulverising treatment. While this technique did improve the properties of the final product of the reaction, it still was not totally satisfactory. Consequently, it would be most desirable to have a new catalyst which further improves the product quality.

SUMMARY OF THE INVENTION

Accordingly, it is an object of this invention to provide a component of a catalyst used for polymerization of an α-olefin which enables production of crystalline polymers in high yields.

This and other objects of this invention as will hereinafter be made clear by the ensuing discussion, have been attained by providing a process for polymerization of α-olefins which uses an α-olefin polymerization catalyst comprising a catalytic component formed by adding (a) oxygen and the reaction product of titanium tetrachloride and an organic ether, to (b) titanium trichloride or to a composition comprising titanium trichloride and a metal halide (hereinafter referred to as a composition of titanium trichloride) and subjecting this component to a milling treatment. When this product is used as a catalyst, the proportion of the crystalline polymer formed to the total polymer producted is surprisingly improved over that of the prior methods using conventional catalytic components.

DETAILED DESCRIPTION OF THE PREFERRED EMBODIMENTS

Suitable compositions of titanium trichloride according to the present invention include those compounds obtained by reducing a titanium halide of the maximum valency, according to conventional methods. Suitable reducing agents include hydrogen, metallic titanium, metallic aluminum, metal hydrides such as sodium hydride, magnesium hydride or silicon hydrides (silanes), and organometallic compounds, such as organic aluminum compounds including triethyl aluminum and dialkyl aluminum halogenides. The reaction product having the composition corresponding substantially to $Ti_3 Al Cl_{12}$, which is prepared by reacting about 3 moles of titanium tetrachloride with about 1 mole of metallic aluminum, is especially preferred for use as the composition of titanium trichloride.

Suitable organic ethers for use in this invention include organic ethers having at least one ether group in the molecule. Such organic ethers include lower dialkyl ethers such as diethylether, n-propylether, isobutylether, methylbutylether and the like; ethers obtained from alkylene glycol or polymers thereof such as ethylene glycol monoethylether, diethylene glycol dimethylether, triethylene glycol and the like; dioxanes such as 1,4 dioxane, 2 methyl 1,3 dioxane and the like; alkylarylethers such as anisole, parapropenylanisole and the like; and diarylethers such as diphenylether and the like. Quantitative differences in the end product are caused by variations in the kind of ether used. The most satisfactory effect is obtained when the lower dialkyl ethers, the alkylarylethers or the organic ethers obtained from alkylene glycol or a polymer thereof are employed.

The reaction product of titanium tetrachloride and the organic ether according to the present invention is obtained by the reaction of titanium tetrachloride and the organic ether at temperatures in the range of from that at which the ether is in the liquid state to the boiling point of the ether. It is preferred that the titanium tetrachloride to be used in this invention be sufficiently purified. Also, oxygen gas of a high purity is preferred for use in this invention.

The addition of oxygen and the reaction product can occur at any time before, after or during the milling treatment of the composition of titanium trichloride, so long as the composition of titanium trichloride, oxygen and the reaction product are sufficiently reacted and uniformly mixed.

Suitable pulverizers for use in the milling treatment according to the present invention include conventional pulverizers which have been used in the past for the fine pulverization of powder such as a ball mill, a vibration mill, an aerofoil mill, a tower type grinder, a ring mill, an impact grinder and the like. The amount of time required for the milling treatment can be determined by the conventional techniques well known to those skilled in the art. The period will depend on the type of pulverizers used in the milling treatment and the medium being pulverized. The milling treatment is preferably conducted in an atmosphere of an inert gas at a temperature of −20° C. to +80° C., preferably 0° C. to 60° C. The inert gas atmosphere, of course, is not necessary when the milling is performed during the addition of the oxygen.

The molar concentration of oxygen should be 0.1 to 5 mole %, based on the number of moles of the composition of titanium trichloride. When the amount of oxygen exceeds 5 mole %, the catalytic activity is drastically lowered and the yield of the crystalline polymer is reduced. When the amount of oxygen is smaller than 0.1 mole %, the oxygen addition has no substantial effect.

The amount of the reaction product relative to the amount of the composition of titanium trichloride should be 0.1 to 30 weight %, preferably 1 to 15 weight %. In the reaction product titanium tetrachloride should be present within 0<titanium tetrachloride <100 weight %, preferably 1 to 70 weight % relative to the amount of organic ether.

The titanium compound catalytic component according to this invention constitutes a catalyst, together with an organic aluminum compound, known as a component of a Ziegler type catalyst. It can also be used with the aluminum compound, with other known catalytic components such as an electron-donative compound. In either form it is very effective for polymerization of $\alpha$-olefins.

Having generally described the invention, a more complete understanding can be obtained by reference to certain specific examples, which are included for purpose of illustration only and are not intended to be limiting unless otherwise specified.

EXAMPLE 1

200 g of a composition of titanium trichloride having a formula substantially equal to $Ti_3 Al Cl_{12}$ is charged into a vibration mill with a 1.0 liter inner capacity. The mill has an argon gas atmosphere and contains a 0.8 liter apparent volume of 12mm $\phi$ steel balls. The composition of titanium trichloride is milled at 35° C. for 30 hours in the atmosphere of argon. Then a reaction product formed between 10g of diethylether and 2g of titanium tetrachloride is admixed therewith and further milled at 35° C. for 5 hours. 1 mole % of oxygen gas based on the number of moles of the composition of titanium trichloride is then charged into the mill and further milled at 35° C. for 5 hours. A catalytic component is obtained.

A 1.5 liter stainless steel autoclave is filled with argon and loaded with 0.5g of the resulting catalytic component, 0.75g of diethyl aluminum monochloride and 500 ml of n-heptane. The autoclave is heated to 70° C., 200 ml of hydrogen is fed and propylene is fed into the autoclave. The propylene is polymerized at a propylene partial pressure of 6.03 Kg/cm$^2$ G at 70° C. for 2 hours.

After the polymerization is stopped by adding butanol into the autoclave, the contents of the autoclave are sufficiently shaken to decompose the catalyst and filtered. Then, the solid reactants are washed with a mixture of isopropanol and methanol and dried in vacuo to yield a solid polymer. The amount of the resulting polymer is designated as (B).

Then, the resulting solid polymer is extracted with boiling heptane for 6 hours to yield a heptane insoluble polymer. The amount of the heptane insoluble polymer is designated as (C).

The amount of polymer remaining in the solvent is designated as (A). The yield of the isotactic polymer (D) can thus be calculated by the formula:

$$D = C/(A+B) \times 100$$

The polymerization activity (E) of the catalyst can be calculated by the formula:

$$E = A + B/\text{amount of catalyst}$$

The yield of atactic polymer can be calculated by the formula:

$$100 - D$$

The results are shown in Table 1.

EXAMPLE 2

The experiment is conducted in the same manner as in Example 1 except that 1 mole % of oxygen based on the number of moles of the composition of titanium trichloride is added prior to initiation of the milling treatment of the composition of titanium trichloride. Then the milling treatment is conducted for 35 hours. A reaction product derived from 8 g of diethylether and 2 g of titanium tetrachloride is added and the milling treatment is conducted for 5 hours to obtain a catalytic component. Results obtained are shown in Table 1.

EXAMPLE 3

The experiment is conducted in the same manner as in Example 1 except that a reaction product derived from 18 g of diethylether and 3 g of titanium tetrachloride is added prior to the milling treatment of the composition of titanium trichloride (having a composition corresponding substantially to $Ti_3 Al Cl_{12}$).

The milling treatment is conducted for 10 hours, 1 mole % of oxygen based on the number of moles of the composition of titanium trichloride is added and then the milling treatment is further conducted for 30 hours to obtain a catalytic component. Results obtained are shown in Table 1.

EXAMPLE 4

The experiment is conducted in the same manner as in Example 1 except that 1 mole % of oxygen based on the number of moles of the composition of titanium trichloride is added prior to the milling treatment of the composition of titanium trichloride (having a composition corresponding substantially to $Ti_3 Al Cl_{12}$). The milling treatment is conducted for 20 hours. A reaction product derived from 16 g of diethylether and 4 g of titanium tetrachloride is added and the milling treatment is conducted for 20 hours to obtain a catalytic component. Results obtained are shown in Table 1.

EXAMPLE 5

The experiment is conducted in the same manner as in Example 1 except that a reaction product derived from 6 g of diethylether and 3 g of titanium tetrachloride and 1 mole % of oxygen based on the number of moles of the composition of titanium trichloride are added prior to the milling treatment of the composition of titanium trichloride (having a composition corresponding substantially to $Ti_3 Al Cl_{12}$). Then the milling treatment is carried out for 40 hours to obtain a catalytic component. Results obtained are shown in Table 1.

EXAMPLE 6

The experiment is conducted in the same manner as in Example 1 except that 1 mole % of oxygen based on the number of moles of the composition of titanium trichloride is added prior to the milling treatment of the composition of titanium trichloride (having a composition corresponding substantially to $Ti_3 Al Cl_{12}$). The milling treatment is conducted for 20 hours. A reaction product derived from 12 g of diethyl glycol dimethylether and 2 g of titanium tetrachloride is added and the milling treatment is conducted for 20 hours to obtain a catalytic component. Results obtained are shown in Table 1.

EXAMPLE 7

The experiment is conducted in the same manner as in Example 1 except that a reaction product derived from 10 g of anisole and 2 g of titanium tetrachloride is added prior to the milling treatment of a composition of titanium trichloride (having a composition corresponding substantially to $Ti_3 Al Cl_{12}$). The milling treatment is conducted for 35 hours. 1 mole % of oxygen based on the number of moles of the composition of titanium trichloride is added and the milling treatment is further conducted for 5 hours to obtain a catalytic component. Results obtained are shown in Table 1.

EXAMPLE 8

The experiment is conducted in the same manner as in Example 1 except that 0.15% of oxygen gas based on the number of moles of the composition of titanium trichloride is added. Results obtained are shown in Table 1.

EXAMPLE 9

The experiment is conducted in the same manner as in Example 1 except that 5 mole % of oxygen gas based on the number of moles of the composition of titanium trichloride is added. Results obtained are shown in Table 1.

EXAMPLE 10

The experiment is conducted in the same manner as in Example 1 except that the composition of titanium trichloride (having a composition corresponding substantially to $Ti_{3.5} Al Cl_{13.5}$ is subjected to a milling treatment for 10 hours. Then a reaction product formed between 16 g of diethylether and 2g of titanium tetrachloride is admixed therewith and further milled for 25 hours. One (1) mole % of oxygen based on the number of moles of the composition of titanium trichloride is then added and further milled for 5 hours. A catalytic component is obtained. Results obtained are shown in Table 1.

EXAMPLE 11

The experiment is conducted in the same manner as in Example 1 except that 1 mole % of oxygen gas based on the number of moles of the composition of titanium trichloride is added prior to the milling treatment of titanium trichloride (having a composition corresponding substantially to $Ti_{2.5} Al Cl_{10.5}$). The milling treatment is conducted for 30 hours. A reaction product derived from 18g of diethylether and 2g of titanium tetrachloride is then added and the milling treatment is conducted for 10 hours to obtain a catalytic component. Results obtained are shown in Table 1.

COMPARATIVE EXAMPLE 1

The experiment is conducted in the same manner as in Example 1 except that the composition of titanium trichloride (having a composition corresponding substantially to $Ti_3 Al Cl_{12}$) is subjected to a milling treatment for 35 hours. 5 g of diethylether alone is added instead of oxygen and the diethylether-titanium tetrachloride reaction product. Then the milling treatment is further conducted for 5 hours to obtain a catalytic component. Results obtained are shown in Table 2.

COMPARATIVE EXAMPLE 2

The experiment is conducted in the same manner as in Comparative Example 1 except that 20 g of diethylether is added prior to the milling treatment of the composition of titanium trichloride (having a composition corresponding substantially to $Ti_3 AlCl_{12}$). Then the milling treatment is conducted for 40 hours to obtain a catalytic component. Results obtained are shown in Table 2.

COMPARATIVE EXAMPLE 3

The experiment is conducted in the same manner as in Example 1 except that the composition of titanium trichloride (having a composition corresponding substantially to $Ti_3 AlCl_{12}$ is subjected to a milling treatment for 20 hours. 2 g of titanium tetrachloride and 8 g of diethylether are individually but simultaneously added instead of oxygen and the diethylether-titanium tetrachloride reaction product. The milling treatment is conducted for 20 hours to obtain a catalytic component. Results obtained are shown in Table 2.

COMPARATIVE EXAMPLE 4

The experiment is conducted in the same manner as in Comparative Example 3 except that the composition of titanium trichloride (having a composition corresponding substantially to $Ti_3 Al Cl_{12}$) is subjected to a milling treatment for 30 hours. 16 g of diethylether and 4 g of titanium tetrachloride are added individually but simultaneously and the milling treatment is then conducted for 10 hours to obtain a catalytic component. Results obtained are shown in Table 2.

COMPARATIVE EXAMPLE 5

The experiment is conducted in the same manner as in Example 1 except that the composition of titanium trichloride (having a composition corresponding substantially to $Ti_3 Al Cl_{12}$) is subjected to the milling treatment for 35 hours. 1 mole % of oxygen alone based on the number of moles of the composition of titanium trichloride is added instead of oxygen and the diethylether-titanium tetrachloride reaction product. The milling treatment is conducted for 5 hours to obtain a catalytic component. Results obtained are shown in Table 2.

COMPARATIVE EXAMPLE 6

The experiment is conducted in the same manner as in Example 1 except that the composition of titanium trichloride (having a composition corresponding substantially to $Ti_3 Al Cl_{12}$) is subjected to a milling treatment for 35 hours. A reaction product derived from 10 g of diethylether and 2.1 g of titanium tetrachloride is added instead of oxygen and the diethylether-titanium tetrachloride reaction product. The milling treatment is then conducted for 5 hours to obtain a catalytic component. Results obtained are shown in Table 2.

COMPARATIVE EXAMPLE 7

The experiment is conducted in the same manner as in Comparative Example 6 except that prior to the milling treatment of the composition of titanium trichloride (having a composition corresponding substantially to $Ti_3 Al Cl_{12}$) a reaction product derived from 10 g of diethylether and 2.1 g of titanium tetrachloride is added. The milling treatment is conducted for 40 hours to obtain a catalytic component. Results obtained are shown in Table 2.

COMPARATIVE EXAMPLE 8

The experiment is conducted in the same manner as in Comparative Example 1 except that 0.05 mole % of oxygen gas based on the number of moles of the composition of titanium trichloride is added. Results obtained are shown in Table 2.

COMPARATIVE EXAMPLE 9

The experiment is conducted in the same manner as in Comparative Example 1 except that 6 mole % of oxygen gas based on the number of moles of the composition of titanium trichloride is added. Results obtained are shown in Table 2.

From the results shown in Tables 1 and 2, it can easily be seen that when polymerization is carried out by using a catalyst comprising a catalytic component prepared according to the process of this invention, the yield of the crystalline polymer is significantly improved over the yield of the crystalline polymer obtained when polymerization is carried out by using a catalyst comprising a catalytic component prepared according to a method outside the scope of this invention.

Table 1

| | Experimental Results | | | | | | | | |
|---|---|---|---|---|---|---|---|---|---|
| | Example 1 | Example 2 | Example 3 | Example 4 | Example 5 | Example 6 | Example 7 | Example 8 | Example 9 |
| Amount (A)g of Polymer Remaining in Polymerization Solvent | 2.1 | 2.3 | 2.3 | 2.4 | 2.6 | 2.5 | 2.6 | 2.5 | 2.3 |
| Amount (B)g of Solid Polymer | 211.2 | 206.8 | 207.5 | 200.4 | 203.3 | 201.8 | 204.2 | 209.5 | 195.0 |
| Amount (C)g of Boiling Heptane-Insoluble Polymer | 209.5 | 204.9 | 205.4 | 198.3 | 200.8 | 200.1 | 201.8 | 207.1 | 202.0 |
| Yield (D)% of Isotactic Polymer, ($\frac{C}{(A + B)} \times 100$) | 98.2 | 98.0 | 97.9 | 97.8 | 97.5 | 97.9 | 97.6 | 97.7 | 97.4 |
| Polymerization Activity (E) of Catalyst, ($\frac{A + B}{\text{amount of catalyst}}$) | 426.6 | 418.2 | 419.6 | 405.6 | 411.8 | 408.6 | 413.6 | 424.0 | 394.6 |
| Yield % of Atactic Polymer, (100 − D) | 1.8 | 2.0 | 2.1 | 2.2 | 2.5 | 2.1 | 2.4 | 2.3 | 2.6 |

| | Example 10 | Example 11 |
|---|---|---|
| Amount (A)g of Polymer Remaining in Polymerization Solvent | 2.4 | 2.5 |
| Amount (B)g of Solid Polymer | 201.9 | 201.8 |
| Amount (C)g of Boiling Heptane-Insoluble Polymer | 199.8 | 199.4 |
| Yield (D)% of Isotactic Polymer, ($\frac{C}{(A + B)} \times 100$) | 97.8 | 97.6 |
| Polymerization Activity (E) of Catalyst, ($\frac{A + B}{\text{amount of catalyst}}$) | 410.4 | 408.6 |
| Yield % of Atactic Polymer, (100 − D) | 2.2 | 2.4 |

Table 2

| | Experimental Results | | | | | | |
|---|---|---|---|---|---|---|---|
| | Comparative Example 1 | Comparative Example 2 | Comparative Example 3 | Comparative Example 4 | Comparative Example 5 | Comparative Example 6 | Comparative Example 7 |
| Amount (A)g of Polymer Remaining in Polymerization Solvent | 5.5 | 5.7 | 4.0 | 3.6 | 7.6 | 2.9 | 3.2 |
| Amount (B)g of Solid Polymer | 198.8 | 197.9 | 197.2 | 198.9 | 191.7 | 200.9 | 198.7 |
| Amount (C)g of Boiling Heptane-Insoluble Polymer | 193.3 | 193.0 | 192.3 | 194.0 | 185.7 | 197.3 | 195.2 |
| Yield (D)% of Isotactic Polymer, | | | | | | | |

Table 2-continued

| | Experimental Results | | | | | | |
|---|---|---|---|---|---|---|---|
| ($\frac{C}{(A+B)} \times 100$) | 94.6 | 94.8 | 95.6 | 95.8 | 93.2 | 96.8 | 96.7 |
| Polymerization Activity (E) of Catalyst, ($\frac{A+B}{\text{amount of catalyst}}$) | 408.6 | 407.2 | 402.4 | 405.0 | 398.6 | 407.6 | 403.8 |
| Yield % of Atactic Polymer, (100 − D) | 5.4 | 5.2 | 4.4 | 4.2 | 6.8 | 3.2 | 3.3 |

| | Comparative Example 8 | Comparative Example 9 |
|---|---|---|
| Amount (A)g of Polymer Remaining in Polymerization Solvent | 3.5 | 6.0 |
| Amount (B)g of Solid Polymer | 200.0 | 124.8 |
| Amount (C)g of Boiling Heptane-Insoluble Polymer | 197.0 | 120.6 |
| Yield (D)% of Isotactic Polymer, ($\frac{C}{(A+B)} \times 100$) | 96.8 | 92.2 |
| Polymerization Activity (E) of Catalyst, ($\frac{A+B}{\text{amount of catalyst}}$) | 407.0 | 261.6 |
| Yield % of Atactic Polymer, (100 − D) | 3.2 | 7.8 |

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. In a process for preparation of a component of a catalyst for polymerization of α-olefin comprising adding (A) the reaction product of titanium tetrachloride and an organic ether to (B) titanium trichloride (TiCl$_3$) or to a composition of titanium trichloride and an aluminum halide having the formula substantially equal to Ti$_3$ AlCl$_{12}$, and milling the mixture; the improvement which comprises adding oxygen and (A) to (B) wherein the amount of oxygen added during the step of the addition of (A) and (B) is from 0.1 to 5 mole % based on the number of moles of titanium trichloride or the number of moles of the composition of titanium trichloride and aluminum halide.

2. The process for preparation of a catalytic component for polymerization of α-olefin of claim 1 wherein the organic ether is a lower dialkyl ether.

3. The process for preparation of a catalytic component for polymerization of α-olefin of claim 1 wherein the organic ether is an alkylarylether.

4. The process for preparation of a catalytic component for polymerization of α-olefin of claim 1 wherein the organic ether is a dioxane.

5. The process for preparation of a catalytic component for polymerization of α-olefin of claim 1, wherein the organic ether is ethylene glycol monoethyl ether or diethylene glycol dimethylether.

6. The process for preparation of a catalytic component for polymerization of α-olefin of claim 1 wherein the addition and milling of oxygen and the reaction product of titanium tetrachloride and an organic ether are conducted individually.

7. The process for preparation of a catalytic component for polymerization of α-olefin of claim 1 wherein the milling is conducted at a temperature of from −20° C. to 80° C.

8. The process for preparation of a catalytic component for polymerization of α-olefin of claim 1 wherein the milling is conducted in an atmosphere of an inert gas unless the milling is performed during the addition of oxygen.

9. The process for preparation of a catalytic component for polymerization of α-olefin of claim 1 wherein in the reaction product the amount of titanium tetrachloride is 0<titanium tetrachloride <100 weight % relative to the amount of organic ether.

10. The process for preparation of a catalytic component for polymerization of α-olefin of claim 1 wherein the amount of the reaction product between titanium tetrachloride and the organic ether relative to the amount of the titanium trichloride or the composition of titanium trichloride and aluminum halide is from 0.1 to 30 weight %.

11. The catalytic component of a catalyst for polymerization of α-olefin prepared by the process of claim 1.

* * * * *